US 7,849,014 B2

United States Patent
Erikson

(10) Patent No.: US 7,849,014 B2
(45) Date of Patent: Dec. 7, 2010

(54) SYSTEM AND METHOD FOR FACILITATING A FINANCIAL TRANSACTION WITH A DYNAMICALLY GENERATED IDENTIFIER

(75) Inventor: Glade Raymond Erikson, Glendale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 106 days.

(21) Appl. No.: 11/847,088

(22) Filed: Aug. 29, 2007

(65) Prior Publication Data
US 2009/0063345 A1 Mar. 5, 2009

(51) Int. Cl.
*G06Q 40/00* (2006.01)
(52) U.S. Cl. .............................. 705/44; 705/35; 705/38; 705/39; 705/40
(58) Field of Classification Search .................. 705/35, 705/38, 39, 40, 44
See application file for complete search history.

(56) References Cited

U.S. PATENT DOCUMENTS

| | | | |
|---|---|---|---|
| 5,996,076 A | 11/1999 | Rowney et al. | |
| 2006/0278698 A1* | 12/2006 | Lovett | 235/380 |
| 2007/0198405 A1 | 8/2007 | Bishop et al. | |
| 2007/0260544 A1* | 11/2007 | Wankmueller | 705/44 |
| 2008/0040285 A1* | 2/2008 | Wankmueller | 705/67 |
| 2008/0054081 A1* | 3/2008 | Mullen | 235/494 |
| 2008/0306876 A1* | 12/2008 | Horvath et al. | 705/76 |

OTHER PUBLICATIONS

Global Credit Authorization Guide (v3.2), Aug. 11, 2006.*
MasterCard SecureCode for Online Merchants, Jan. 2006.*
ISR dated Nov. 3, 2008 in Serial No. PCT/US08/73555.
Colin Baptie; Visa by Topic; http://corporate.visa.com/md/fs/ecommerce/passcode_authorization.jsp?topic=tech; Mar. 21, 2007.
Visa by Topic Fact Sheet: Dynamic Passcode Authentication; http://corporate.visa.com/md/fs/ecommerce/passcode_authentication_print.jsp; Mar. 20, 2007.
Lisa Phifer; Beyond Passwords Part 2: Implementing The Vision; www.smallbusinesscomputing.com/webmaster/article.php/3498116; Apr. 15, 2005.
WebLink Implementation Guide Card-Not-Present Transactions Version 1.0; pp. 1-3 and 42.

* cited by examiner

*Primary Examiner*—Shahid R Merchant
(74) *Attorney, Agent, or Firm*—Snell & Wilmer L.L.P.

(57) ABSTRACT

Instead of a PIN which is associated with an account and provides access to an account, a dynamically generated card identifier (dynamic CID) is used to verify that the consumer currently possesses the transaction card at the time of purchase and/or is the true card owner. At the time of purchase, a token generates a dynamic CID, which changes with each transaction. A consumer enters the dynamic CID into a pre-existing CID field in an electronic order form. The merchant then sends the dynamic CID to a card authorization system within an authorization request. The card authorization system issues a response to a merchant system via a pre-existing authorization message indicating that the transaction card and dynamic CID have been validated, thereby adjusting the fraud risk associated with the transaction.

12 Claims, 5 Drawing Sheets

SYSTEM AND METHOD FOR FACILITATING A FINANCIAL TRANSACTION WITH A DYNAMICALLY GENERATED IDENTIFIER

FIELD OF THE INVENTION

The present invention generally relates to transaction card fraud reduction, and more particularly, to verifying that a consumer is in possession of a transaction card and/or is the true card owner during a purchase transaction through validation of a dynamically generated card identifier.

BACKGROUND OF THE INVENTION

Transaction cards such as, for example, credit cards, debit cards, bank cards, charge cards, smart cards and the like, have become increasingly popular for purchasing goods and services and for conducting other transactions. A transaction card typically includes information related to the issuer's name and logo, an account number, an expiration date and the cardholder's name. The cards may also have other information printed on the card to represent the account or the card member such as, for example, a serial number, a group number, a promotion number, a card type number, a plastic issuance number and/or the like. For many transaction cards, the information printed on the card is also contained within a magnetic stripe, a bar code, a transponder and/or an integrated circuit (microchip) for automatic downloading/reading by a reader.

Many card transactions are commenced by inserting, or sliding a card through, a card reader which automatically downloads the card information, thereby allowing the information to be used during the authorization process without the need for manual input or review of the card information. However, because of the substantial increase in fraudulent use and theft of transaction cards, the use of the card information is often supplemented by various fraud prevention techniques, such as requiring a signature to verify the consumer's agreement to the transaction, only shipping to the address associated with the transaction card, or the entry of a PIN number to verify the consumer's authority to use the transaction card. Certain card issuers (e.g., banks) may also incorporate the consumer's picture onto the face of the transaction card to give the merchant an additional verification procedure.

While the use of a signature, PIN or picture is effective for fraud reduction when the cardholder presents a card to a merchant, these options are not as effective, and may not be available, for other transactions. Particularly, transactions which do not require face-to-face contact between a consumer and merchant, such as the use of a transaction card to purchase items through the Internet or over the telephone (e.g., mail order). Moreover, many transactions may be alternatively completed without using the physical transaction card. For example, a consumer or merchant may simply key in the transaction card number into a POS device keypad or an ATM keypad.

When conducting Internet, telephone or keypad transactions, a cardholder may only need to provide a card account number and expiration date to allow the merchant to charge a particular account and verify that the transaction card is valid. Other verification information, such as a PIN number, is usually not disclosed because the PIN is typically memorized by the cardholder and never disclosed to a merchant. Because merchants often only request limited information to conduct a transaction over the Internet or the telephone, an increased potential for fraud exists due to the increased availability of this general information. In other words, regardless of a consumer's possession of the physical transaction card, a consumer can still fraudulently obtain and provide this general information.

Particularly, cardholders often provide a transaction card number to telemarketers, merchants, bank tellers and Internet sites, thereby allowing a merchant or clerk to retain the transaction card number and associated information for later fraudulent use. Moreover, a person may overhear a transaction card number being disclosed over the telephone or, with the increase of mailbox thefts; a person may obtain a transaction card number from a billing statement or promotional literature. Furthermore, advanced computer operators are able to intercept transaction card numbers which are transmitted over modems and/or the Internet. Accordingly, when a merchant simply requests a transaction card number from a consumer, it is difficult for the merchant to ensure that the consumer placing the order has the transaction card in his or her possession and/or is the true card member, rather than using a stolen account number.

With the increased popularity in online shopping, the numbers of Card Not Present (CNP) transactions have increased rapidly in recent years. CNP transactions carry an additional risk of fraud, as the merchant has little assurance that the consumer using the charge card account number to facilitate a purchase transaction is in fact the authorized user of the charge card. In order to add assurance that the consumer is in possession of the charge card, many merchant web sites now require the consumer to enter a card security code or Card Identification Number (CID), often printed on the front and/or reverse side of the charge card.

However, as is the case with providing transaction card information to a merchant, the risk of an employee of the merchant obtaining the transaction card information and using it fraudulently remains, even with the use of a CID. Therefore, some card issuers have sought to overcome this problem by bypassing the merchant and providing a static password or CID directly to the card issuer to be paired with other transaction card information for authorization. However, such a process has required online merchants to make significant changes to their web sites, has extended the time for completing the purchasing process, and has required consumers to complete a sign-up process for such an additional service. For example, merchant web sites employing this type of security configuration often rely on a separate window or pop-up to collect the CID from the card holder. In this manner, the CID can be isolated from other transaction card information and transmitted directly to the card issuer, thereby eliminating the possibility of exposing the static password or CID to the merchant. However, many consumers abort a transaction when required to enter additional information into a pop-up window, or when required to sign-up for a new security service in order to complete a transaction. Moreover, such a system for bypassing a merchant may not be necessary if a dynamic CID is used because the CID changes with each transaction.

While the CID provides an additional layer of assurance that the card is in the possession of the purchaser, it does not remedy the problems associated with credit card fraud resulting from unauthorized recording of credit card information, including the CID, or theft of the physical credit card. Due to the security concerns discussed above, some merchants may remain reluctant to accept online orders through the use of a transaction card when the shipping address is different than the billing address. Instead of a PIN which is associated with an account and provides access to an account, online merchants generally require entry of a CID, which is printed on the transaction card but does not provide automatic access to an account. This sort of CID is static, and does not guarantee that the physical card is in the possession of the consumer.

Accordingly, a system is needed which allows the consumer to disclose a dynamically generated card identifier (dynamic CID) that is associated with the account number, yet changes with each purchase transaction. Moreover, there is a need for a system and method for creating a dynamic CID that may be entered into a standard CID field, which is a common security feature of many of today's online merchant order forms, without requiring the modification of existing online merchant order forms. Such additional security measures may enable issuers to accept more of the risk, and at the same time, reduce the security and extra data collection requirements imposed on merchants.

SUMMARY OF THE INVENTION

Accordingly, the present invention provides for a dynamically generated CID that is created at the time of purchase from a hardware and/or software token. As used herein, a dynamically generated CID may further be known as a "one-time password", as it is frequently referred to within the industry. The system enables the entry of a dynamically generated CID within a card security identifier form field, which is a common requirement among merchants. Contrary to prior art systems, the present invention enables a dynamically generated CID to be entered and processed from existing card security identifier form fields, thereby reducing or eliminating the need for merchants to modify their web sites and order processing routines. The system enables the dynamic CID to be transmitted to a card authorization system by way of pre-existing authorization request message. Such a pre-existing authorization request message may include a code that is in a four digit batch code (4DBC) request format. As used herein, a batch code request comprises any code that may be dynamically generated as disclosed herein. An example of a batch code request includes a four digit batch code (4DBC) that may be included in an authorization request message, as may be applied within the industry (e.g., American Express). Practitioners will appreciate that the disclosed 4DBC may be described as a 4DBC request, 4DBC request message, 4DBC number, as well as any other number, code, indicia, identifier, and the like. Moreover, the various messages as disclosed herein may include an authorization request message, which may itself include a 4DBC formatted request message or any other message used to authenticate and/or authorize a transaction.

The authorization message, as used herein, may comprise a 1100 message as it may be known within the industry (e.g., American Express). Practitioners will appreciate that the batch code request and authorization message, as well as any other code, message, and identifier described herein, may be configured in any manner and may vary among transaction card issuers.

The card authorization system compares the dynamic CID to a verification CID that is created under the same algorithm used by the token which generated the dynamic CID. After verifying other account information (e.g., card account number, expiration date, and available funds), the card authorization system transmits an authorization response to the merchant again using pre-existing authorization request message format (also known as a 1110 message). The authorization is indicative of a card present transaction and represents a higher level of authentication, therefore, the merchant is allowed a greater assurance that the transaction not fraudulent.

Thus, the entry of the dynamic CID helps verify that the consumer possesses the transaction card at the time of purchase or is the true card owner, rather than simply using a stolen account number. Accordingly, requiring entry of a dynamically generated CID along with the account number provides an effective deterrent to fraudulent use of the account number because the account number is essentially unusable without the proper token.

BRIEF DESCRIPTION OF THE DRAWINGS

A more complete understanding of the invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

The detailed description of exemplary embodiments of the invention herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In general, the invention includes a unique system for facilitating secure transactions that are easily and readily adaptable to existing online order forms and commercial transaction processing systems. While the system may contemplate upgrades or reconfigurations of existing processing systems, changes to cardholder or merchant systems are not necessarily required by the present invention. For example, the present system may contemplate, but does not require: downloading of software modules; a digitally-based, nonphysical commerce card; activation or deactivation of the secondary transaction number; and certain embodiments do not require the existing online consumer to separately register for the service. Moreover, the transaction system herein described can be seamlessly integrated into current electronic commerce processes with minimal to no changes to existing systems used by cardholders or merchants.

While described herein in reference to facilitating transactions in an online environment, practitioners will appreciate that the invention may further be implemented to facilitate secure commerce transactions via other mediums where face-to-face interaction between the seller and purchaser is not possible and/or impractical. For instance, the invention may be used in conjunction with a telephony system configured to accept orders by way of a telephone. Other examples of such non-traditional commerce may take place by way of a variety of handheld devices such as palm computers and cellular telephones. Therefore, while the description makes frequent reference to a web client, practitioners will appreciate that this is but one embodiment and that other devices and/or methods may be implemented without departing from the scope of the invention.

Figure 1:
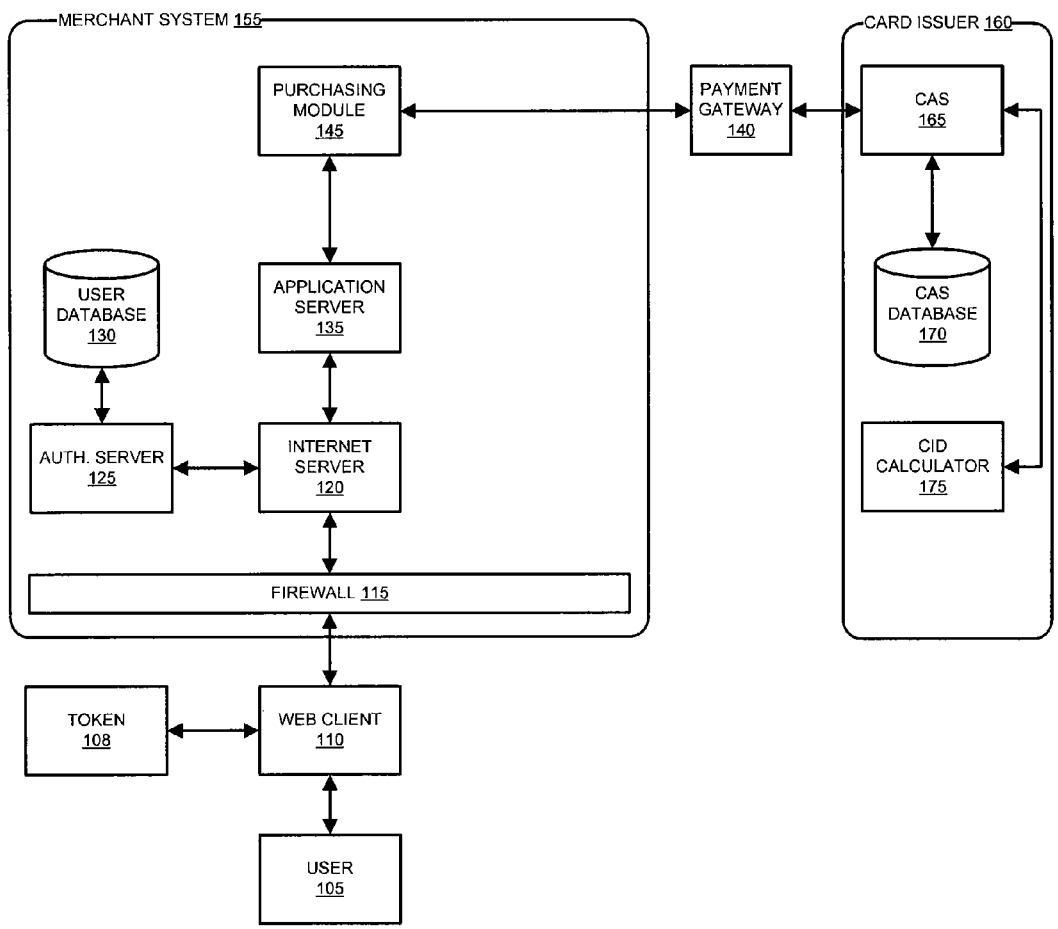
FIG. 1 is an overview of an exemplary system for facilitating a transaction authorization based on a transaction card and dynamically generated card identifier, in accordance with various embodiments of the present invention.

With reference to FIG. 1, the system includes a user 100 interfacing with a merchant system 155 by way of a web client 110. While described in the context of online purchases, practitioners will appreciate that the present invention may be similarly used in the context of telephone purchases, mail order purchases, and any other purchasing scenario where face-to-face interaction is limited or nonexistent. However, for the sake of explanation, the use and processing of the dynamic CID will be used in the context of Internet based purchase transactions between a consumer (user 105) and a merchant (merchant system 155).

Transmissions between user 105 and internet server 120 may pass through a firewall 115 to help to ensure the integrity of merchant 155 components. Practitioners will appreciate that the invention may incorporate any number of security schemes or none at all. In one embodiment, Internet server 120 receives page requests from web client 110 and interacts with various other merchant system 155 components to perform tasks related to requests from web client 110. Internet server 120 may invoke an authentication server 125 to verify the identity of user 105 and assign specific access rights to user 105. Authentication database 130 may store information used in the authentication process such as, for example, user identifiers, passwords, access privileges, user preferences, user statistics, and the like. When a request to access merchant system 155 is received from Internet server 120, Internet server determines if authentication is required and transmits a prompt to web client 110. User 105 enters authentication data at web client 110, which transmits the authentication data to Internet server 120. Internet server 120 passes the authentication data to authentication server which queries user database 130 for corresponding credentials. When user 105 is authenticated, user 105 may access various merchant web pages and select one or more products and/or services for purchase.

When user 105 selects an item (e.g., information, product and/or service) for purchase, Internet server 120 may invoke an application server 135. Application server 135 invokes purchasing logic in purchasing module 145 by passing parameters relating to user 105 selection of items for purchase. Purchasing module 145 may further interact with an inventory database (not shown) to ensure that an adequate inventory level exists and tally the purchase transaction total including any applicable fees and taxes. Information confirming the selected items and the transaction amount is transmitted to web client 110 in a web page. User 105 confirms the purchase information, selects a payment option, and enters address and transaction card information into a purchase form.

Figure 2A:
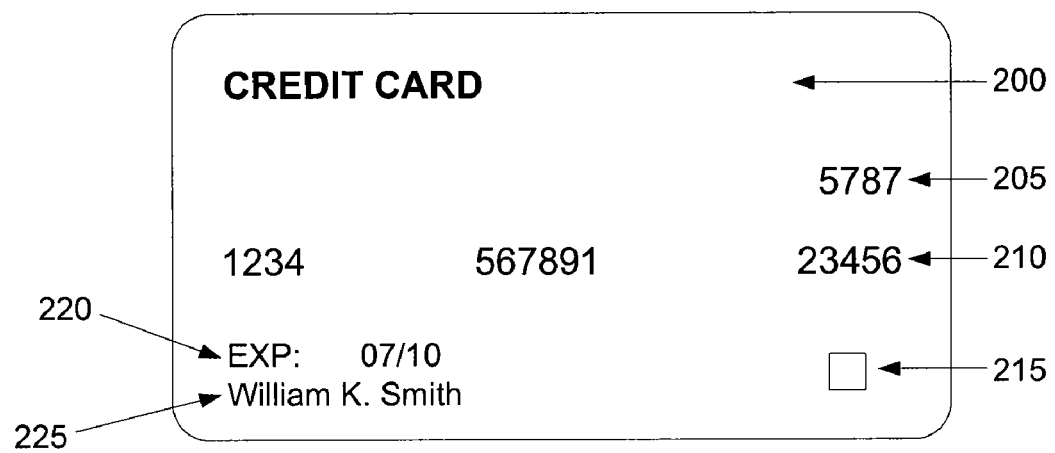
FIG. 2A is a diagram of an exemplary front portion of a transaction card, in accordance with various embodiments of the present invention.
Figure 2B:
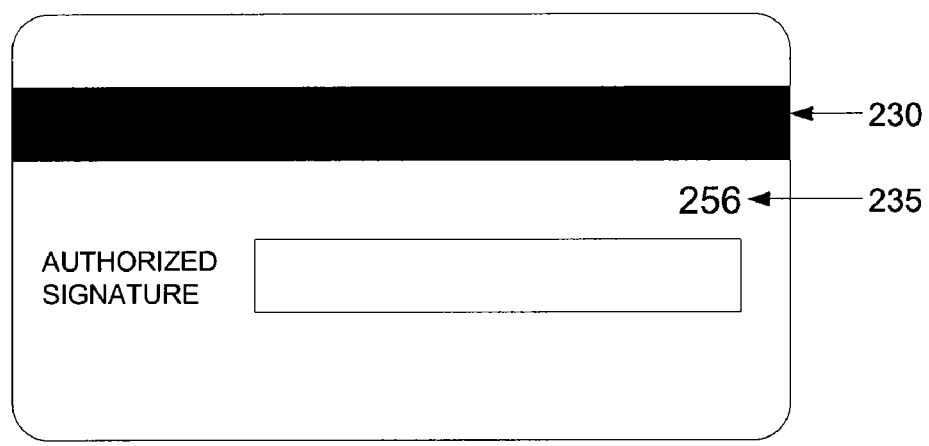
FIG. 2B is a diagram of an exemplary back portion of a transaction card, in accordance with various embodiments of the present invention.
Figure 3:
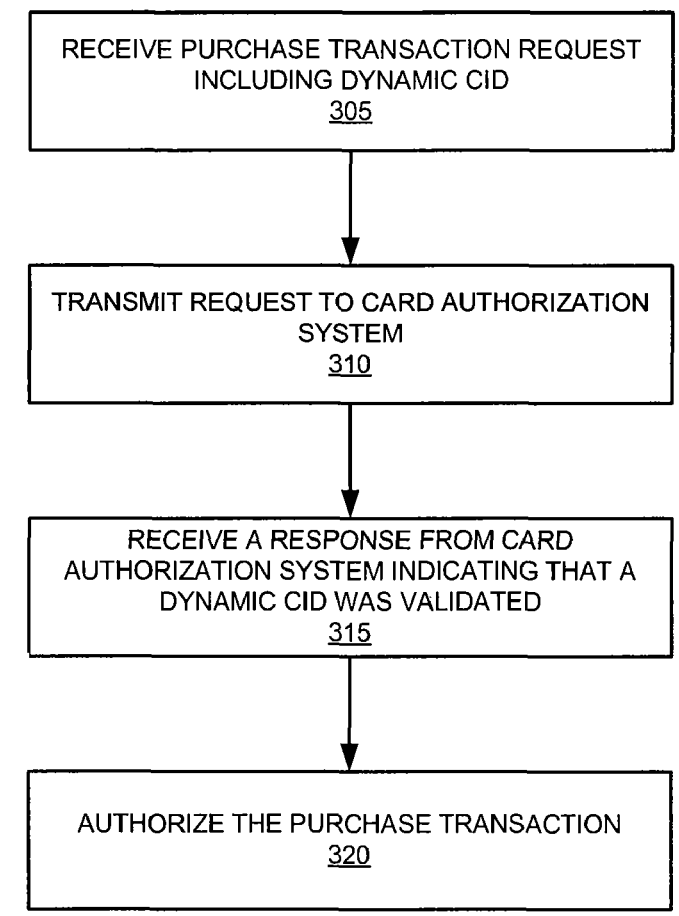
FIG. 3 is a process flow diagram showing a high-level view of an exemplary process for facilitating a secure online commerce transaction; and, FIGS. 4A-4B is a process flow diagram of an exemplary process for facilitating a secure online commerce transaction through the use and validation of a dynamically generated card identification number.

With reference to FIGS. 2A-2B and 3, user 105 interfaces with a token 108 in order to obtain a dynamically generated CID and enters the CID into a card security number field on the merchant's order form. Many online order forms include a field for a card security identifier. A static card security number is most often printed on the back of a transaction card 235 and is used to help verify that user 105 is in physical possession of the transaction card. In one embodiment, a dynamic CID is generated by token 108 and is automatically entered into the card security identifier form field by web client 110. In another embodiment, user 105 interfaces a transaction card with token 108. Token 108 reads card account information from either a magnetic stripe 230 on the back of the transaction card, a transponder, or a computer chip 215 usually located on the front of the transaction card. Other information that user 105 may be required to provide includes, for example, a mailing address, a shipping address, user's name 225 as it appears on the transaction card 200, transaction card expiration date 220, and a transaction card account number 210.

The completed order form is transmitted to Internet server 120 from web client 110. Internet server 135 passes the information to purchasing module 145 where the content and format of the order form data is verified. Payment module 145 interfaces with a payment gateway 140 to transmit a transaction authorization request to a card issuer 160. The transaction authorization request may include, for example, transaction card account number 210, expiration date 220, cardholder name 225, billing address, transaction amount, merchant identifier, and the dynamically generated CID. Card issuer 160 may include a Card Authorization System (CAS) 165 that formats the transaction request and queries one or more CAS databases to validate the transaction card and transaction amount. CAS includes a CID calculator 175 that generates a confirmation CID based on any number of variants used when generating the CID at the token 108. Various methods and algorithms may be used in generating a dynamic CID as will be discussed in greater detail herein. CAS 165 compares the CID from the transaction request to the confirmation CID to determine if the two match or substantially match. If a match is confirmed and other transaction account information is confirmed, CAS 165 transmits a transaction approved message to purchasing module 145 along with an indicator that confirms that a valid dynamic CID was provided by user 105. Purchase module 145 may then finalize the purchase transaction and communicate order status to user 105 by way of web page, email, telephone, or any other method known in the art.

In addition to the components described above, merchant system 155 may further include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: user database 130; account database 150, CAS database 170, and/or like data useful in the operation of system 100.

As will be appreciated by one of ordinary skill in the art, one or more of the components of system 100 may be embodied as a customization of an existing system, an add-on product, upgraded software, a stand alone system (e.g., kiosk), a distributed system, a method, a data processing system, a device for data processing, and/or a computer program product. Accordingly, individual system 100 components may take the form of an entirely software embodiment, an entirely hardware embodiment, or an embodiment combining aspects of both software and hardware. Furthermore, individual system 100 components may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The invention contemplates uses in association with loyalty, incentive or reward programs, web services, utility computing, pervasive and individualized computing, security and identity solutions, autonomic computing, commodity computing, mobility and wireless solutions, open source, biometrics, grid computing and/or mesh computing. For example, in an embodiment, the web client 110, transaction card, and/or token are configured with a biometric security system that may be used for providing biometrics as a secondary form of identification. In another embodiment, token 108 may include a biometric device as part of the process of generating the dynamic CID. The biometric security system may include a transaction device and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. patent application Ser. No. 10/708,822, titled "System For Biometric Security Using A Fob," filed Mar. 26, 2004; and U.S. patent application Ser. No. 10/708,823, titled "Method For Biometric Security Using A Transponder," filed Mar. 26, 2004, which are hereby incorporated by reference.

User 105 may include any individual, business, entity, government organization, software and/or hardware that interact with system 100 to purchase products and/or services from one or merchants. User 105 may be, for example, a person shopping at home, or a procurement manager who interacts with system 100 to shop for and purchase goods and/or services for a department within a corporation. User 105 may interface with Internet server 120 via any communication protocol, device or method discussed herein, known in the art, or later developed. In one embodiment, user 105 may interact with merchant system 155 via an Internet browser at a web client 110.

Web client 110 comprises any hardware and/or software suitably configured to facilitate input, receipt and/or review of information relating to purchases or any information discussed herein. Web client 110 includes any device (e.g., personal computer), which communicates (in any manner discussed herein) with merchant system 155 via any network discussed herein. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that web client 110 may or may not be in direct contact with merchant system 155. For example, web client 110 may access the services of merchant system 155 through another server, which may have a direct or indirect connection to Internet server 120.

As those skilled in the art will appreciate, web client 110 includes an operating system (e.g., Windows NT, 95/98/2000, OS2, UNIX, Linux, Solaris, MacOS, etc.) as well as various conventional support software and drivers typically associated with computers. Web client 110 may include any suitable personal computer, network computer, workstation, mini-computer, mainframe or the like. Web client 110 can be in a home or business environment with access to a network. In an exemplary embodiment, access is through a network or the Internet through a commercially available web-browser software package.

Web client 110 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network.

Token 108 as used herein, may comprise any hardware and/or software suitably configured to provide authentication in order to facilitate a card present transaction in an online commerce environment. The token may take the form of standalone electronic device and may comprise a keychain fob, a credit card sized PIN pad, a USB device, and/or the like. In one embodiment, the token displays a set of pseudo-random numbers that are generated within defined time intervals such that the next number to be generated cannot be guessed, except by an authentication server that initializes the token. In another embodiment, the token comprises a smart card reader capable of reading a microchip embedded within a smart card. Such smart card readers are commercially available. For example, the VASCO Digipass Go2 smart card reader accepts various compatible smart cards. The smart cards are inserted into the reader and the user is prompted to enter a PIN. An authentication server verifies that the PIN corresponds to the inserted smart card. Other tokens incorporate biometric reads to offer an even higher degree of identity certainty. A software embodiment of token 108 may be downloaded or accessed by a consumer on a home PC such that the consumer may dynamically generate a CID by selecting a "request CID" button on a screen.

Firewall 115, as used herein, may comprise any hardware and/or software suitably configured to protect merchant system 155 components from users of other networks. Firewall 115 may reside in varying configurations including stateful inspection, proxy based and packet filtering, among others. Firewall 115 may be integrated as software within Internet server 120, any other system components, or may reside within another computing device or may take the form of a standalone hardware component.

Internet server 120 may include any hardware and/or software suitably configured to facilitate communications between web client 110 and one or more merchant system 155 components. Further, Internet server 120 may be configured to transmit data to web client 110 within markup language documents. As used herein, "data" may include encompassing information such as commands, queries, files, data for storage, and/or the like in digital or any other form. Internet server 120 may operate as a single entity in a single geographic location or as separate computing components located together or in separate geographic locations.

Internet server 120 may provide a suitable web site or other Internet-based graphical user interface, which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a web site having web pages. The term "web page" as it is used herein is not meant to limit the type of documents and applications that might be used to interact with the user. For example, a typical web site might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and/or the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the Internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

Application server 135 may include any hardware and/or software suitably configured to serve applications and data to a connected web client 110. Like Internet server 120, application server 135 may communicate with any number of other servers, databases and/or components through any means known in the art. Further, application server 135 may serve as a conduit between web client 110 and the various systems and components of the merchant system 155. Internet server 120 may interface with application server 135 through any means known in the art including a LAN/WAN, for example. Application server 135 may further invoke purchasing module 145 in response to user 105 requests.

Purchasing module 145 may include any hardware and/or software suitably configured to receive requests from web client 110 via Internet server 120 and application server 135. Purchasing module 145 is further configured to process requests, construct database queries, execute queries against product database, as well as exchange data with card issuer 160 via payment gateway 140. In one embodiment, purchasing module 145 may be configured to interact with other merchant system 155 components to perform complex calculations, retrieve additional data, format data into reports, create XML representations of data, construct markup language documents, and/or the like. Moreover, purchasing module 145 may reside as a standalone system or may be incorporated with application server 135 or any other merchant system 155 component as program code.

The merchant system 155 and the card issuer 160 may be interconnected via a second network, referred to as a payment gateway. Payment gateway may include any hardware and/or software suitably configured to facilitate communications and/or process transactions between merchant system 155 and card issuer 160. Payment gateways are commercially available and known in the art. Payment gateway may be implemented through commercially available hardware and/or software, through custom hardware and/or software components, or through a combination thereof. Payment gateway 140 may reside in a variety of configurations and may exist as a standalone system or may be a software component residing either inside merchant system 155, card issuer 160, or any other known configuration. Payment gateway 140 may be configured to process transactions between purchasing module 145 and other systems and components within merchant system 155 and/or systems and components residing in card issuer 160. In one embodiment, payment gateway 140 may comprise web services that are invoked to exchange data between the various disclosed systems. The payment gateway represents existing proprietary networks that presently accommodate transactions for credit cards, debit cards, and other types of financial/banking cards. The payment gateway is a closed network that is assumed to be secure from eavesdroppers. Examples of the payment gateway or network include the American Express®, VisaNet® and the Veriphone® network.

In order to control access to application server 135 or any other component of merchant system, Internet server 120 may invoke an authentication server 125 in response to user 105 submissions of authentication credentials received at Intranet server 120. Authentication server 125 may include any hardware and/or software suitably configured to receive authentication credentials, encrypt and decrypt credentials, authenticate credentials, and/or grant access rights according to pre-defined privileges attached to the credentials. Authentication server 125 may grant varying degrees of application and data level access to users based on information stored within user database 130.

User database 130 may include any hardware and/or software suitably configured to facilitate storing identification, authentication credentials, and/or user permissions. Account database 130 stores data relating to account numbers, user descriptors, use parameters, and/or the like. One skilled in the art will appreciate that merchant system 155 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the system by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of system 100, the data can be stored without regard to a common format. However, in one exemplary embodiment of the invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand-alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand-alone device, the appropriate option for the action to be taken. System 100 contemplates a data storage arrangement wherein the header or trailer, or header or trailer history, of the data is stored on the transaction instrument in relation to the appropriate data.

One skilled in the art will also appreciate that, for security reasons, any databases, systems, devices, servers or other components of system 100 may consist of any combination thereof at a single location or at multiple locations, wherein each database or system includes any of various suitable security features, such as firewalls, access codes, encryption, decryption, compression, decompression, and/or the like.

The invention may be described herein in terms of functional block components, screen shots, optional selections and various processing steps. It should be appreciated that such functional blocks may be realized by any number of hardware and/or software components configured to perform the specified functions. For example, system 100 may employ various integrated circuit components, e.g., memory elements, processing elements, logic elements, look-up tables, and/or the like, which may carry out a variety of functions under the control of one or more microprocessors or other control devices. Similarly, the software elements of system 100 may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that system 100 may employ any number of conventional techniques for data transmission, signaling, data processing, network control, and/or the like. Still further, system 100 could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

These software elements may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, web sites, web forms, prompts, etc. Practitioners will appreciate that the illustrated steps described herein may comprise in any number of configurations including the use of windows, web pages, web forms, popup windows, prompts and/or the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

As used herein, "transaction" or similar terms may include any exchange of a monetary or other value for items. Specifically, with regard to the present invention, a transaction takes place when a holder of a transaction account provides an account code to a service establishment in order to facilitate a transfer of funds from the transaction account to the service establishment. A service establishment may comprise any merchant of goods, services, information and/or other items.

An "account", "account number" or "account code", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a fob having a transponder and RFID reader in RF communication with the fob. Although the system may include a fob embodiment, the invention is not to be so limited. Indeed, system may include any device having a transponder which is configured to communicate with RFID reader via RF communication. Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account number may be distributed and stored in any form of plastic, electronic, magnetic, radio frequency, wireless, audio and/or optical device capable of transmitting or downloading data from itself to a second device. A consumer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, etc. In this example, the last (sixteenth) digit is used as a sum check for the sixteen-digit number. The intermediary eight-to-ten digits are used to uniquely identify the consumer. A merchant account number may be, for example, any number or alpha-numeric characters that identify a particular merchant for purposes of card acceptance, account reconciliation, reporting, or the like.

Referencing the computer networked aspect of an exemplary embodiment of this invention; each participant is equipped with a computing system to facilitate online commerce transactions. The computing units may be connected with each other via a data communication network. The network is a public network and assumed to be insecure and open to eavesdroppers. In the illustrated implementation, the network is embodied as the internet. In this context, the computers may or may not be connected to the internet at all times. For instance, the cardholder computer may employ a modem to occasionally connect to the internet, whereas the card provider computing center might maintain a permanent connection to the internet. It is noted that the network may be implemented as other types of networks, such as an interactive television (ITV) network.

Practitioners will appreciate that there are a number of methods for displaying data within a browser-based document. Data may be represented as standard text or within a fixed list, scrollable list, drop-down list, editable text field, fixed text field, pop-up window, and/or the like. Likewise, there are a number of methods available for modifying data in a web page such as, for example, free text entry using a keyboard, selection of menu items, check boxes, option boxes, and/or the like.

To reduce fraud when conducting commercial transactions (i.e., the purchase of items) using a transaction card, the present system requests entry of an additional number to help verify that the consumer has possession of the transaction card at the time of ordering and/or purchase or is the true card owner, rather than simply using a stolen account code. Wherein a PIN number is typically memorized and not written down, the present number, called a dynamic card identifier (CID), is generated by a token 108 and entered into a standard CID field commonly included in online merchant order forms. The dynamic CID is used to help verify that the consumer possesses the transaction card at the time of purchase and/or is the true card owner of the card account.

With momentary reference to FIGS. 2A and 2B, in accordance with the present invention, a transaction card 200 includes any device suitably configured to display an account code 210 and a card identification code 205 to be used in facilitating transaction requests. Practitioners will appreciate that FIGS. 2A and 2B, as well as the descriptions herein, are provided for explanation only and are not intended to limit the scope of the invention in any way. Moreover, it should be appreciated that transaction cards may take many forms such as, for example, credit card, charge card, debit card, smart card, bank card and/or the like.

As background regarding a static CID, transaction card 200 includes information for conducting a transaction. In an exemplary embodiment, the front face of transaction card 200 includes an account code 210 and a card identification code 205 located above account code 210. Account code 210 includes any number of characters (n characters) comprising any combination of numbers, letters, symbols or other indicia which are suitably configured to identify a transaction account. In a preferred embodiment, account code 210 is a 15-digit number which identifies an account code, including a routing number or other similar transaction numbers, corresponding to the card owner. One of ordinary skill in the art will appreciate that account code 210 may be associated with an individual account, a corporate account, an organization account, or any other entity and the account may represent a charge account, a credit account, a debit account, an electronic purse account, or any other financial account. In one embodiment, transaction card 200 includes a computer chip 215 storing account code 210, card identification code 205 and any other information useful in facilitating purchase transactions. In another embodiment, such information may be encoded within a magnetic stripe 230, barcode, and/or the like.

Card identification codes 205, 230, and 235 include any number of characters (n characters) comprising any combination of numbers, symbols, letters, or other indicia suitably configured to provide verification that the consumer has an actual card in possession at the time of purchase and/or is the true card owner, rather than simply using a stolen account code. In a preferred embodiment, card identification code 205 is printed on, embossed on, or encoded in transaction card 200. Card identification code 205 may be located on either side of the card, encoded into a medium on the card and may be embossed (raised lettering) or unembossed (flat) into the plane of the card. In a particular embodiment, card identification code 205 is located on the front face of transaction card 10 on the same side as, and above, account code 210. In one embodiment, card identification code 205 is a four-digit, unembossed (flat) number printed within the plane of the card. One skilled in the art will appreciate that, along with other card member information, card identification codes 205, 230, or 235 may be initially printed on many transaction cards 200 before, during or after account code 210 is printed on transaction card 200. In a preferred embodiment, card identification codes 205 or 235 are logically related to card identification code 230, which may be encoded within a magnetic stripe.

After a consumer is approved for a transaction card, an account code 210, a four-digit identification code 205 and/or a three digit code 235, an expiration date 220 and other information are associated with the consumer's name in a CAS database 170. In an exemplary embodiment, at the time of creating transaction card 200 for user 105, in accordance with the present invention, a five-digit security code 230, four-digit identification code 205 and three-digit identification code 235 is suitably calculated from an associated account number and card expiration date 220 based upon a predetermined algorithm. Five-digit identification code 210 is preferably calculated and encoded into the magnetic stripe 230 and/or computer chip 215 because five-digit identification code 210 provides additional security by not being disclosed on the face of the card (only four-digit code 205 or three-digit code 235 are visible).

Figure 4A:
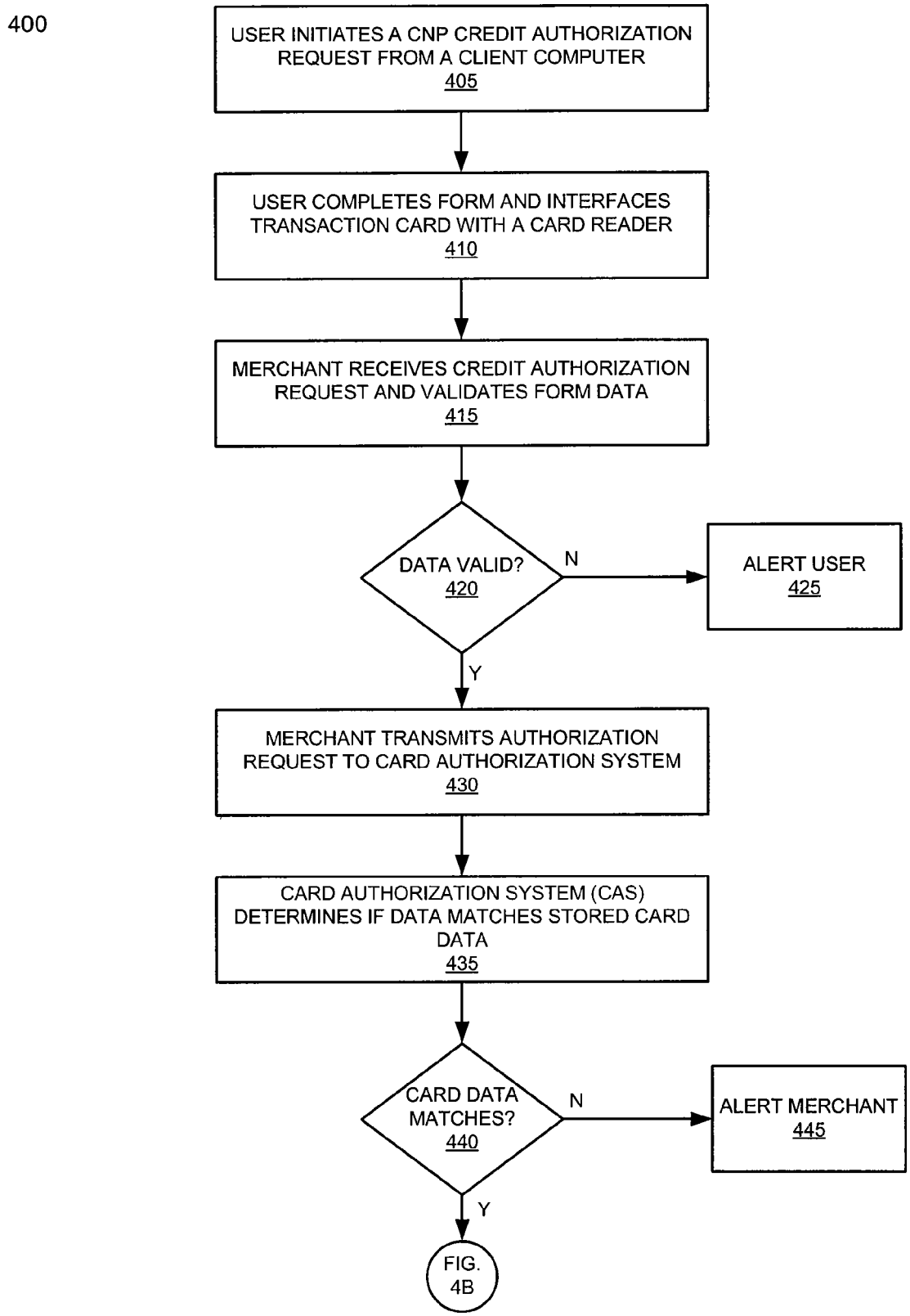
Figure 4B:
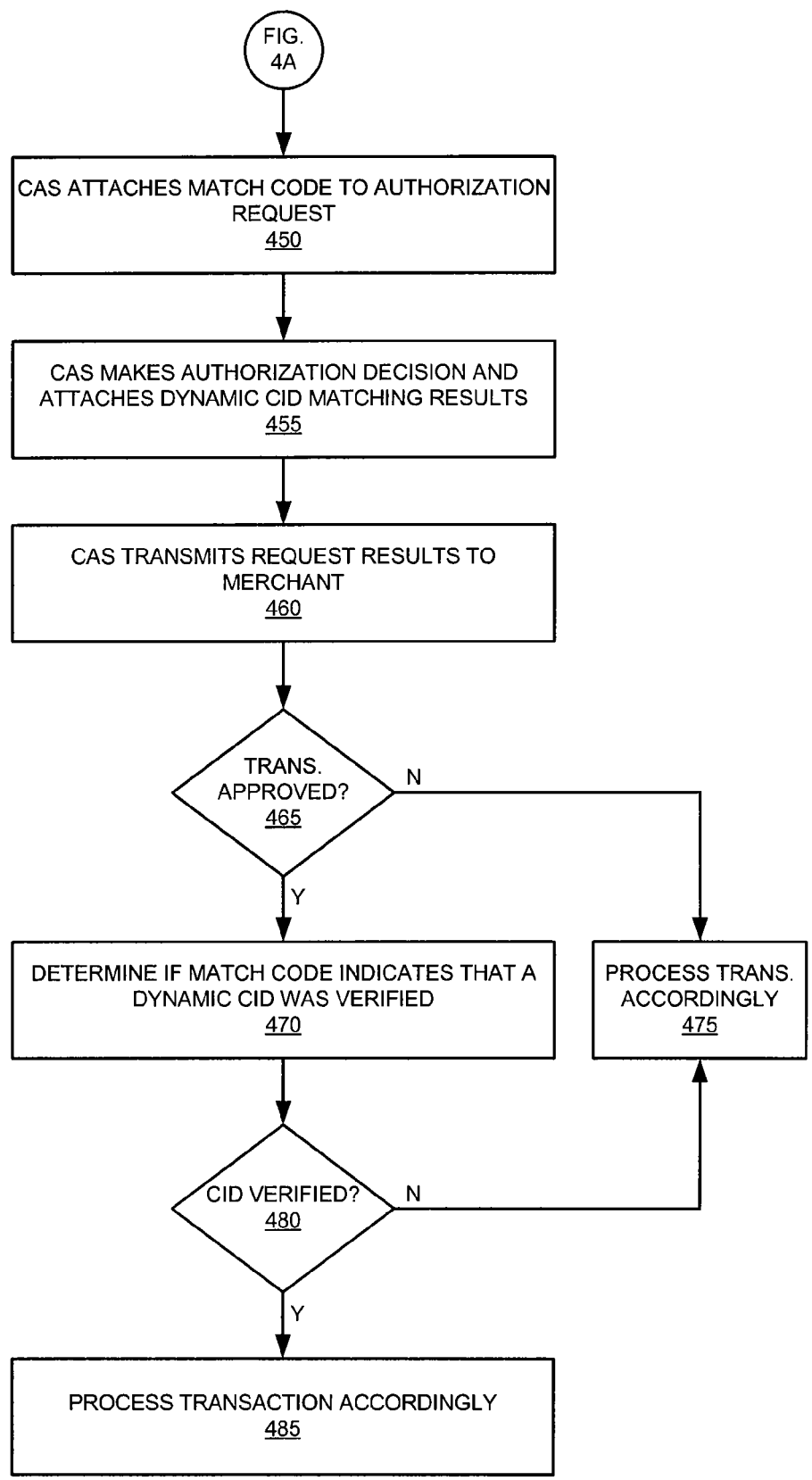

Referring now to the figures, the block system diagram and process flow diagram represent mere embodiments of the invention and are not intended to limit the scope of the invention as described herein. For example, the steps recited in FIGS. 4A and 4B may be executed in any order and are not limited to the order presented. It will be appreciated that the following description makes appropriate references not only to the steps depicted in FIGS. 4A and 4B, but also to the various system components as described above with reference to FIG. 1.

With reference to FIG. 3, an exemplary process for facilitating a secure online purchase transaction using a dynamically generated CID begins when a merchant system 155 receives a purchase transaction request that includes a dynamically generated CID (step 305). As discussed in reference to FIG. 1, a dynamic CID is generated by a token and is entered into a security identifier field of an online order form. In prior art systems, this number is static and is retrieved from the transaction card 235 and entered into a security identifier form field by user 105. In one embodiment, the static CID may be found on the front of the transaction card 200 as a four digit card security code, or on the back of the transaction card as a three digit security code. However, practitioners will appreciate that variations among the various elements of transaction cards will likely exist.

Merchant system 155 receives a completed order form from web client 110 and transmits a card authorization request to a card authorization system (step 310). The card authorization system validates account data including the CID. The merchant system 155 receives a response from the card authorization system indicating that the account information was validated, funds are available, and that a dynamically generated CID was provided by user 105 and validated. This is especially significant for transactions where the transaction card billing address is different than the provided delivery address due to the heightened probability of fraud. In these situations, merchants are most often liable for fraudulent purchases, thus may be hesitant to engage in such transactions. However, a dynamically generated CID provides a high level of assurance that the transaction card is truly in the possession of the true card holder; therefore, the merchant may be more inclined to engage in commerce with user 105. Furthermore, for transactions that include the dynamically generated CID, card issuers may be more likely to assume responsibility for fraud in situations where the billing and delivery addresses do not correspond to one another. Thus, there may be little reason for the merchant to decline to engage in such transactions because the merchants are assured payment. On receiving confirmation that a dynamic CID was validated, the merchant system 155 authorizes the purchase transaction (step 320).

The steps outlined in FIG. 3 above will now be described in greater detail in reference to FIG. 4. In an online environment, certain purchases using a transaction card (e.g., telephone, Internet, etc) are commonly referred to as Card Not Present (CNP) transactions, as there has traditionally been no way to ensure that the user of the transaction card is in physical possession of it. Accordingly, when user 105 chooses to purchase items in an online environment, user 100 initiates a CNP credit authorization request from a client computer (step 405). In response, purchasing module 145 verifies inventory, calculates a transaction amount, and presents web client 110 with an online order form. The order form may include a confirmation of the item(s) ordered along with a break-down of the transaction amount. User 105 completes the order form, and in one embodiment, interfaces a transaction card with a card reading device of the token (step 410). Information required on the order form may include, for example, the user's name, mailing address, transaction card account number, transaction card expiration date, transaction card billing address, a delivery method selection, and the like. In another embodiment, user 105 is not required to interface the transaction card with the reader device, however, may be required to enter a PIN, enter a card account number, or provide any other indices that may be used by token 108 to generate a dynamic CID. In yet another embodiment, user 105 may not be required to provide token 108 with any information or input, as token may use an algorithm that is shared by a card authorization system. Such algorithms may be based on time, for example, to generate a random number that is known only by the token and the card authorization system. In any case, the dynamically generated CID may be manually entered into a card security number field of the online form or automatically populated by the token 108 or digital wallet when connected to web client 110.

The completed order form is received by the merchant system 155 as a credit authorization request and purchasing module 145 validates the content and form of the authorization request data (step 415). If data is missing or is not in the proper format (step 420), then purchasing module 145 may alert user (step 425) and present the form back to web client 110 where user 105 may enter required corrections. If the credit authorization request data is valid (step 420), then purchasing module 145 transmits a formatted authorization request to the appropriate card authorization system (CAS 165) (step 430).

CAS 165 determines if data in the formatted authorization request matches stored card data (step 435). Specifically, the matching process determines whether corresponding four-digit batch code (4DBC), four digit card security code (4CSC), and three digit card security code (3CSC) that are stored in CAS database 170 matches those within the formatted authorization request. Furthermore, CAS 165 determines if the 3CSC is a standard card security code or whether the code in the formatted authorization request is a dynamically generated CID. If the 3CSC contains a dynamic CID, then CAS 165 validates the CID by invoking an algorithm that is shared by the token that was used to generate the CID. Practitioners will appreciate that a card issuer may look for a dynamic CID in a 4DBC, 4CSC, or 3CSC field.

If the matching process is not successful and/or the dynamic CID is not validated (step 440), then a response is transmitted to the merchant indicating that the request is not valid (step 445). If, however, CAS 165 successfully matches the formatted authorization request and validates the dynamic CID (step 440), then CAS 165 attaches match codes to the authorization request using existing 4DBC, 4CSC, and 3CSC data messages (step 450). CAS 165 further makes an authorization decision based on, for example, the matching process, verified account balance, spending limits, and the like (step 455). In one embodiment, CAS 165 incorporates the dynamic CID match results in the authorization decision.

CAS 165 transmits the authorization request results, including the dynamic CID verification results, to the merchant system 155 (step 460). In one embodiment, the message (e.g., results) is transmitted to the merchant within an authorization message (e.g., 1100 message). Purchasing module 145 evaluates the request results to determine whether the transaction was approved (step 465). If the transaction was not approved, then the transaction is processed according to the merchant's policies (step 475). Such policies may include, for example, ending the buyer's web session, prompting the buyer to re-enter card information, asking for another form of payment, and the like. If the transaction was approved (step 465), then purchasing module 145 determines if the match code provided by CAS 165 indicates that a dynamic CID was verified (step 470). If a dynamic CID was not verified (step 480), then the transaction is processed according to the merchants policies (step 475). Whether purchasing module 145 determines that a dynamic CID was verified or a standard card security identifier was verified, the manner by which the transaction is processed may be left to the discretion of the merchant (step 485). As previously noted, validation of a dynamic CID should provide the merchant with a high level of confidence that the purchase transaction is not fraudulent. As such, the merchant may be inclined to approve a purchase transaction (and the issuer may be inclined to accept any risks), even when the billing address and shipping address are not the same.

While the steps outlined above represent a specific embodiment of the invention, practitioners will appreciate that there are any number of computing algorithms and user interfaces that may be applied to create similar results. The steps are presented for the sake of explanation only and are not intended to limit the scope of the invention in any way.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. It should be understood that the detailed description and specific examples, indicating exemplary embodiments of the invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above. Reference to an element in the singular is not intended to mean "one and only one" unless explicitly so stated, but rather "one or more." Moreover, where a phrase similar to at least one of A, B, and C' is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

I claim:

1. A computer-implemented method for facilitating an authorization of a purchase transaction, said method comprising:
   receiving a purchase request message, at a merchant computer system having a processor and non-transitory memory, for a purchase transaction, wherein said purchase request message includes a code as part of said purchase request message, and wherein said code is retrieved from a preexisting field of an electronic payment form from said merchant computer system, wherein said code is entered into a pre-existing card identifier (CID) field of said electronic payment form, and wherein said merchant computer system does not know a type of said code within said purchase request message;
   transmitting, from said merchant computer system, at least a portion of said purchase request message to an authorization system in a pre-existing data message comprising said code, wherein said authorization system authenticates said code;
   receiving, at said merchant computer system, a response from said authorization system in a pre-existing data message indicating that said code is a valid dynamically generated code comprising four digit batch code (4DBC) and confirms an allocation to an issuer of a fraud risk associated with said purchase transaction, wherein said response includes an authorization code related to said purchase transaction and indicative of said authorization being based on validation of said dynamically generated code; and
   completing, by said merchant computer system, said purchase transaction.

2. The method of claim 1, wherein said pre-existing data message is at least one of: a four digit card security code (4CSC), or a three digit card security code (3CSC).

3. The method of claim 1, wherein said code is generated by using a token.

4. The method of claim 1, wherein said code is generated using a token, wherein said token includes at least one of: software, a USB device, fob, transaction card reader or pin-pad.

5. The method of claim 1, wherein said code is generated based on interaction between at least one of a transaction card, biometric and a token.

6. The method of claim 4, wherein said code is automatically captured by a point of sale system.

7. The method of claim 6, wherein said code is created based on at least one of: transaction account data, entered Personal Identification Number (PIN), private key, password, profile data, card reader data, and time.

8. A computer-implemented method for authorizing a dynamically generated code, said method comprising:
   receiving, at a host computer having a processor and non-transitory memory, at least a portion of a purchase request message to authorize a purchase transaction from a merchant server, wherein said purchase request message includes a code, and wherein said code is in a pre-existing data message and retrieved from a preexisting field of an electronic payment form from said merchant server, wherein said code is entered into a pre-existing card identifier (CID) field of said electronic payment form, and wherein said merchant server does not know a type of said code within said purchase request message;
   authorizing, at said host computer, said code as a valid dynamically generated code comprising a four digit batch code (4DBC);
   adjusting, by said host computer, a fraud risk associated with said purchase transaction based upon said dynamically generated code; and
   transmitting, by said host computer, said authorization of said dynamically generated code to said merchant server in a pre-existing data message, wherein said authorization includes an authorization code related to said purchase transaction and indicative of said dynamically generated code being valid, wherein said authorization code confirms allocation to an issuer of said fraud risk associated with said purchase transaction, and said authorization being based on validation of said dynamically generated code.

9. A computer-implemented method for conducting a purchase transaction, said method comprising:
   generating, by a personal computing device having a processor and non-transitory memory, a code, wherein said code is entered into a pre-existing card identifier (CID) field of an electronic payment form; and,
   sending, by said personal computing device, a purchase request message in a pre-existing data message to a merchant computer system for a purchase transaction, wherein said purchase request message includes said code, and wherein said merchant computer system does not know a type of said code within said purchase request message, and wherein said merchant computer system transmits at least a portion of said purchase request message to an authorization system in a pre-existing data message and receives a response from said authorization system in a pre-existing data message indicating that said code is valid dynamically generated code comprising a four digit batch code (4DBC) before completing said purchase transaction, and wherein said response includes an authorization code related to said purchase transaction and said dynamically generated code being valid, wherein said authorization code confirms allocation to an issuer of a fraud risk associated with said purchase transaction, and indicative of said authorization being based on said dynamically generated code.

10. The method of claim 9, wherein said generating comprises generating said code via at least one of: a hardware token and a software token.

11. An authorization system for processing a purchase transaction, said authorization system comprising:
   a network interface communicating with a non-transitory memory comprising a database;
   said memory communicating with a host computer;
   said host computer, executing a plurality of computer programs, is configured to:
   receive, at said host computer, at least a portion of a purchase request message to authorize a purchase transaction from a merchant server, wherein said purchase request message includes a code, and wherein said code is in a pre-existing data message and retrieved from a preexisting field of an electronic payment form from said merchant server, wherein said code is entered into a pre-existing card identifier (CID) field of said electronic payment form, and wherein said merchant server does not know a type of said code within said purchase request message;

authorize, at said host computer, said code as a valid dynamically generated code comprising a four digit batch code (4DBC);

adjust, by said host computer, a fraud risk associated with said purchase transaction based upon said dynamically generated code; and transmit, by said host computer, said authorization of said dynamically generated code to said merchant server in a pre-existing data message, wherein said authorization includes an authorization code related to said purchase transaction and indicative of said dynamically generated code being valid, wherein said authorization code confirms allocation to an issuer of said fraud risk associated with said purchase transaction, and said authorization being based on validation of said dynamically generated code.

12. A non-transitory, tangible computer readable storage medium having computer readable instructions stored thereon that, if executed by a host computer, perform operations for authorizing a transaction, comprising:

receiving, at said host computer, at least a portion of a purchase request message to authorize a purchase transaction from a merchant server, wherein said purchase request message includes a code, and wherein said code is in a pre-existing data message and retrieved from a preexisting field of an electronic payment form from said merchant server, wherein said code is entered into a pre-existing card identifier (CID) field of said electronic payment form, and wherein said merchant server does not know a type of said code within said purchase request message;

authorizing, by said host computer, said code as a valid dynamically generated code comprising a four digit batch code (4DBC);

adjusting, by said host computer, a fraud risk associated with said purchase transaction based upon said dynamically generated code; and transmitting, by said host computer, said authorization of said dynamically generated code to said merchant server in a pre-existing data message, wherein said authorization includes an authorization code related to said purchase transaction and indicative of said dynamically generated code being valid, wherein said authorization code confirms allocation to an issuer of said fraud risk associated with said purchase transaction, and said authorization being based on validation of said dynamically generated code.

* * * * *